US009225522B2

(12) United States Patent
Sayed

(10) Patent No.: US 9,225,522 B2
(45) Date of Patent: *Dec. 29, 2015

(54) TECHNIQUES FOR POPULATING A CONTENT STREAM ON A MOBILE DEVICE

(71) Applicant: LinkedIn Corporation, Mountain View, CA (US)

(72) Inventor: Sameer Sayed, San Ramon, CA (US)

(73) Assignee: LinkedIn Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/142,461

(22) Filed: Dec. 27, 2013

(65) Prior Publication Data
US 2015/0188959 A1    Jul. 2, 2015

Related U.S. Application Data

(63) Continuation of application No. 14/141,934, filed on Dec. 27, 2013.

(51) Int. Cl.
*G06F 15/16* (2006.01)
*H04L 9/08* (2006.01)
*H04L 29/08* (2006.01)
*H04M 1/725* (2006.01)

(52) U.S. Cl.
CPC .......... *H04L 9/0872* (2013.01); *H04L 67/2847* (2013.01); *H04M 1/72569* (2013.01); *H04M 1/72572* (2013.01)

(58) Field of Classification Search
CPC .... H04L 9/0872; H04L 12/5865; H04L 51/20
USPC .......... 709/201, 202, 203, 217, 219; 705/14.54, 319, 321
See application file for complete search history.

(56) References Cited

U.S. PATENT DOCUMENTS

| 5,583,763 A | 12/1996 | Atcheson et al. |
| 6,782,370 B1 | 8/2004 | Stack |
| 6,912,505 B2 | 6/2005 | Linden et al. |

(Continued)

FOREIGN PATENT DOCUMENTS

WO    WO-2015100381 A1    7/2015

OTHER PUBLICATIONS

"U.S. Appl. No. 14/141,934, Non Final Office Action mailed Apr. 10, 2014", 33 pgs.

(Continued)

*Primary Examiner* — Jimmy H Tran
(74) *Attorney, Agent, or Firm* — Schwegman Lundberg & Woessner, P.A.

(57) ABSTRACT

Techniques for populating a content stream of a mobile application are described. A content request for content to be presented in a personalized activity or content stream of a member of a social networking service is communicated from a mobile computing device to a content server. The content request includes a member identifier, location information indicating the current location of the member, and/or an activity status identifier indicating an inferred physical activity state of the member. Using the information received with the content request, a content selection and relevance module will process the request and provide contextually relevant content for presentation in the member's activity or content stream, at the mobile device.

22 Claims, 8 Drawing Sheets

(56) References Cited

U.S. PATENT DOCUMENTS

| | | |
|---|---|---|
| 6,947,922 B1 | 9/2005 | Glance |
| 7,548,915 B2* | 6/2009 | Ramer et al. ............... 705/14.54 |
| 7,653,761 B2 | 1/2010 | Juster et al. |
| 7,702,318 B2 | 4/2010 | Ramer et al. |
| 7,831,989 B1 | 11/2010 | Calzone et al. |
| 8,020,104 B2 | 9/2011 | Robarts et al. |
| 8,060,525 B2 | 11/2011 | Svendsen et al. |
| 8,060,827 B2 | 11/2011 | Fischer et al. |
| 8,140,366 B2 | 3/2012 | Adams et al. |
| 8,477,635 B2 | 7/2013 | Sebastian et al. |
| 8,504,559 B1 | 8/2013 | Elman et al. |
| 8,510,123 B2 | 8/2013 | Bonev et al. |
| 8,510,247 B1 | 8/2013 | Kane, Jr. et al. |
| 8,510,785 B2 | 8/2013 | Mckinley et al. |
| 8,520,025 B2 | 8/2013 | Patterson et al. |
| 8,543,941 B2 | 9/2013 | Patterson et al. |
| D697,075 S | 1/2014 | Waldman |
| 8,645,284 B2 | 2/2014 | Nanda et al. |
| 8,938,488 B1 | 1/2015 | Sayed |
| 9,076,349 B2* | 7/2015 | Gupta .................. G06Q 30/02 1/1 |
| 2001/0054029 A1 | 12/2001 | Williams |
| 2002/0083025 A1 | 6/2002 | Robarts et al. |
| 2002/0151992 A1 | 10/2002 | Hoffberg et al. |
| 2003/0009437 A1 | 1/2003 | Seiler et al. |
| 2003/0210226 A1 | 11/2003 | Ho et al. |
| 2004/0133657 A1 | 7/2004 | Smith et al. |
| 2004/0199527 A1 | 10/2004 | Morain et al. |
| 2005/0027671 A1 | 2/2005 | Hind et al. |
| 2007/0033186 A1 | 2/2007 | Cinkle |
| 2007/0094042 A1* | 4/2007 | Ramer et al. ....................... 705/1 |
| 2007/0203763 A1 | 8/2007 | Ackley et al. |
| 2008/0004748 A1* | 1/2008 | Butler et al. ................. 700/244 |
| 2008/0098316 A1* | 4/2008 | Declan ......................... 715/764 |
| 2008/0195824 A1 | 8/2008 | Sadovsky et al. |
| 2009/0077163 A1 | 3/2009 | Ertugrul et al. |
| 2009/0224867 A1 | 9/2009 | O'Shaughnessy et al. |
| 2009/0287750 A1 | 11/2009 | Banavar et al. |
| 2010/0076274 A1 | 3/2010 | Severson |
| 2010/0138416 A1 | 6/2010 | Bellotti |
| 2010/0235329 A1 | 9/2010 | Koren et al. |
| 2011/0196801 A1 | 8/2011 | Ellis et al. |
| 2011/0196802 A1 | 8/2011 | Ellis et al. |
| 2011/0260860 A1* | 10/2011 | Gupta .................. G06Q 30/02 340/539.13 |
| 2012/0023030 A1 | 1/2012 | Jeffries |
| 2012/0095979 A1* | 4/2012 | Aftab et al. .................... 707/706 |
| 2012/0179617 A1 | 7/2012 | Adams et al. |
| 2012/0239173 A1 | 9/2012 | Laikari et al. |
| 2012/0272156 A1* | 10/2012 | Kerger et al. ................. 715/747 |
| 2013/0066963 A1* | 3/2013 | Odio et al. .................... 709/204 |
| 2013/0080611 A1 | 3/2013 | Li et al. |
| 2013/0080968 A1 | 3/2013 | Hanson et al. |
| 2013/0102334 A1 | 4/2013 | Khorashadi et al. |
| 2013/0117266 A1* | 5/2013 | Yahalom et al. .............. 707/737 |
| 2013/0151343 A1 | 6/2013 | Phan |
| 2013/0179441 A1 | 7/2013 | Kuusik |
| 2013/0225206 A1* | 8/2013 | Shuman et al. ............ 455/456.3 |
| 2013/0245986 A1 | 9/2013 | Grokop et al. |
| 2013/0268373 A1 | 10/2013 | Grishaver |
| 2014/0040374 A1* | 2/2014 | Olsen et al. ................... 709/204 |
| 2014/0067704 A1* | 3/2014 | Abhyanker .................. 705/321 |
| 2015/0189069 A1 | 7/2015 | Sayed |

OTHER PUBLICATIONS

"U.S. Appl. No. 14/141,934, Notice of Allowance mailed Sep. 11, 2014", 11 pgs.

"U.S. Appl. No. 14/141,934, Response filed Jul. 10, 2014 to Non Final Office Action mailed Apr. 30, 2014", 9 pgs.

"U.S. Appl. No. 14/141,934, Corrected Notice of Allowance mailed Nov. 14, 2014", 2 pgs.

"U.S. Appl. No. 14/141,934, Notice of Allowability mailed Nov. 3, 2014", 2 pgs.

"International Application Serial No. PCT/US2014/072277, International Search Report nailed Apr. 1, 2015", 2 pgs.

"International Application Serial No. PCT/US2014/072277, Written Opinion mailed Apr. 1, 2015", 10 pgs.

"U.S. Appl. No. 14/597,139, Non Final Office Action mailed May 5, 2015", 30 pgs.

U.S. Appl. No. 14/141,934, filed Dec. 27, 2013, Techniques for Populating a Content Stream on a Mobile Device.

U.S. Appl. No. 14/597,139, filed Jan. 14, 2015, Techniques for Populating a Content Stream on a Mobile Device.

* cited by examiner

TECHNIQUES FOR POPULATING A CONTENT STREAM ON A MOBILE DEVICE

RELATED APPLICATION

The present application is a continuation of U.S. patent application Ser. No. 14/141,934, filed on Dec. 27, 2013.

TECHNICAL FIELD

The present application generally relates to content streams and associated content relevance and selection algorithms. More specifically, the present application describes various techniques by which content items are selected for presentation in a content stream of a software application residing and executing on a mobile computing device.

BACKGROUND

Many network- and/or web-based applications and services that are currently in use, or in development, have a social aspect. For example, users of these applications are encouraged to establish connections with other users, or follow other users, for the purpose of forming virtual communities, forums, groups and/or teams via which the users can collaborate, interact with one another and exchange information. Similarly, users of these applications may be encouraged to follow certain content sources, or subscribe to receive information relating to certain companies, people, topics, web pages, and so forth. With many applications and/or services that have a social aspect, one of the primary content delivery mechanisms is a component that is frequently referred to as a "feed" or "stream." For purposes of the present application, the terms "feed" and "stream" are meant to be synonymous with a variety of other names by which skilled artisans frequently refer to a feed or stream, including such terms as, activity stream, activity feed, content stream, content feed, update stream, update feed, and news feed, among others.

Generally, a feed or stream consists of a list of content items that have been selected for presentation to a particular person (e.g., a user or member of a computer- or web-based service) in a user interface of a software application. Typically, the content items that are presented to a particular user in his or her feed or stream are selected specifically for that particular user, for example, based on the content items having a relationship or association with some entity (e.g., person, company, topic, web page, etc.) with which the user is also related or associated. In many instances, the volume of content items available for presentation to any one user far exceeds the amount that user can practically view and consume. Accordingly, many applications and/or services have some algorithmic means for determining what specific content items are to be presented to any particular user in that user's feed or stream.

For instance, the content items that are presented in a particular user's feed may be selected, for example, using a content relevance or selection algorithm, based on the content items having a relationship to some entity with which the user is also associated or related. In the context of a social network service, for example, many of the content items that appear in a particular user's feed or stream are content items (e.g., individual messages or postings) that have been generated, posted or published by other members of the social network service with whom the particular user is connected or following. Of course, other factors may also be used in various content relevance or selection algorithms for purposes of selecting and ordering content items to present to a user, to include such factors as: the time that a content item was initially posted, published or shared; and, the popularity of a content item as determined by the amount and timing of social interactions (e.g., comments, likes, shares, selections, etc.) that a content item has received. Although content relevance and selection algorithms generally improve the overall user experience by presenting to users content items that are predicted to be of interest to the user, in many instances the content relevance and selection algorithms leave much to be desired.

When viewing a feed or stream within an application executing on a mobile computing device, a user frequently must wait while the mobile computing device requests, receives and renders the content items in the feed presented on the display of the mobile computing device. For example, one conventional way users invoke a request for content items presented in a stream or feed is by performing what is commonly referred to as a pull-to-refresh gesture. As illustrated in FIG. 1, a content stream with various "stale" content items is shown. By simply making a pull-down gesture on the touch screen display of the computing device (as shown with reference number 10-A), a user can invoke a request to refresh the content items presented in the content stream. Accordingly, upon completion of the pull-to-refresh gesture (reference 10-B), a request is communicated from the mobile computing device to a server, where the request is processed, and content items are selected. In processing the request, the server will identify and select the most relevant content items, order those content items, and then communicate those content items over a network to the mobile computing device where the content items are ultimately rendered for presentation to the user. Depending on various factors, for example, such as the availability, bandwidth and latency of a wireless communications network over which the mobile computing device is communicating, the perceived delay (and thus frustration, e.g., 10-C) experienced by the viewing user may be significant.

BRIEF DESCRIPTION OF THE DRAWINGS

Some embodiments are illustrated by way of example and not limitation in the figures of the accompanying drawings in which.

DETAILED DESCRIPTION

The present disclosure describes methods, systems and computer program products for populating a content stream or content feed with current and relevant content items, on a mobile computing device. In the following description, for purposes of explanation, numerous specific details are set forth in order to provide an understanding of various embodiments of the inventive subject matter. It will be evident, however, to those skilled in the art that embodiments may be implemented without each and every specific detail set forth herein. Further, to avoid obscuring the inventive concepts in unnecessary detail, well-known instruction instances, protocols, structures, and techniques that are not germane for purposes of conveying an understanding of the inventive subject matter have not been presented in detail.

Figure 1:
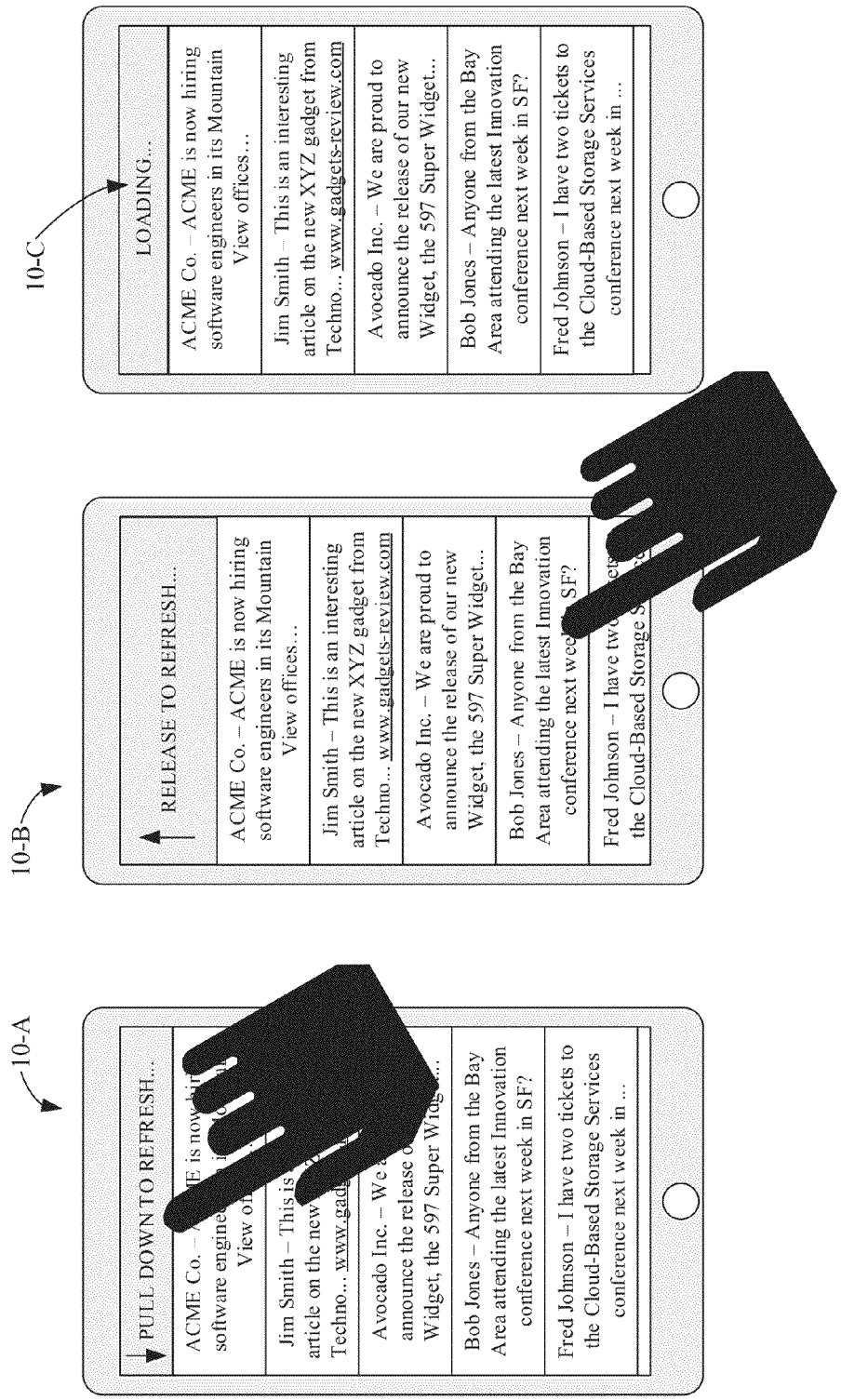
FIG. 1 is a diagram showing a mobile computing device via which a user performs a conventional pull-to-refresh gesture to request and receive content items for presentation in a content stream.

Consistent with some embodiments, a mobile application residing and executing on a mobile computing device, such as a mobile phone or tablet computer, includes a content delivery and presentation mechanism referred to herein as a content stream. In general, the content stream presents content items that are received from a content server, after those content items have been selected specifically for the user by the content server. In order to eliminate frustrating delays encountered when a user is waiting for content items to be received from the server and rendered on the display in response to the user initiating a manual content request (as illustrated in FIG. 1), the mobile application includes logic for predicting when a user is most likely to access the content stream for viewing. Accordingly, with some embodiments, a content request is automatically communicated from the mobile computing device to the content server when certain predefined conditions are satisfied. This allows the mobile application to pre-fetch relevant and timely content items that are to be presented in the content stream, prior to the user taking any action to actually view the content stream.

For example, the mobile application may analyze a variety of data signals to identify patterns that can be used to predict a set of conditions that are most likely to occur immediately before a user views his or her personalized content stream. With some embodiments, the data signals that are analyzed and upon which the predefined conditions are established include at least temporal information, location information, and information concerning the activity state of a user. For instance, a user may tend to initiate a manual content request or view his or her personalized content stream at a particular time of the day, or day of the week. Similarly, a user may tend to initiate a manual content request or view his or her personalized content stream from a particular location (e.g., his or her office, a coffee shop, etc.). Additionally, a user may tend to initiate a manual content request or view his or her personalized content stream while in a particular activity state (e.g., walking, running, sitting, standing, driving or riding in a vehicle, etc.), or after having exhibited a particular pattern of activity states (e.g., walking for ten minutes, and then sitting still for two minutes). Accordingly, by analyzing these various data signals in connection with a user's activity, the mobile application can detect patterns in a user's behavior and establish some predefined conditions, that, when satisfied, will cause the mobile application to automatically (i.e., without explicit user interaction) communicate a content request to a content server. As such, the mobile application will receive relevant and timely content items from the content server. Thus, when the user opens the mobile application to view the content stream, the pre-fetched, relevant and timely content items can be immediately presented, and the user does not experience any delays associated with retrieving content items in response to a manual, user-initiated content request.

Many of the data signals used in establishing the predefined conditions for automatically requesting content for the content stream are derived or generated by sensors of the mobile computing device, or sensors in the immediate environment of the mobile computing device. For example, the location of the mobile computing device may be derived via an on-board global positioning system (GPS) component, with WiFi® (or other radio signal) triangulation using a WiFi radio transceiver, or by receiving a signal (e.g., a Bluetooth® Low Energy (BLE)) broadcast from a device in the environment of the mobile computing device, such as the case might be with an indoor positioning system, such as iBeacons or a similar technology. Similarly, a user's activity state may be inferred by analyzing data signals derived or generated by sensors of the user's mobile computing device. For instance, by analyzing information derived from or generated by an accelerometer, gyroscope, and/or compass, the user's physical activity state (e.g., walking, running, sitting, standing, driving or riding in a vehicle, etc.) can be inferred, based on the motion and orientation, etc., of the mobile computing device. With some embodiments, one or more network-connected sensors may communicate information to the mobile computing device. For example, a user may wear an activity or fitness tracker device, which communicates activity data to the mobile computing device. Accordingly, information such as a person's heart rate, or steps per minute, or similar information may be used to infer an activity state of the user. With some embodiments, the location information may also be considered when inferring the user's activity state.

Consistent with another aspect of the inventive subject matter, a mobile application that provides a content stream on a mobile computing device includes with a content request that is communicated to a content server information identifying the current location of the mobile computing device and/or information identifying a user's inferred activity state. Accordingly, when the content server receives a content request from a mobile computing device, and the request includes such information, the content server can use the received information to select content items that may be relevant, particularly in the context of the user's current location and/or current activity state. Various embodiments of the inventive subject matter presented herein provide the aforementioned features and advantages, as well as other features and advantages, which will be readily apparent from the following description of the various figures.

Figure 2:
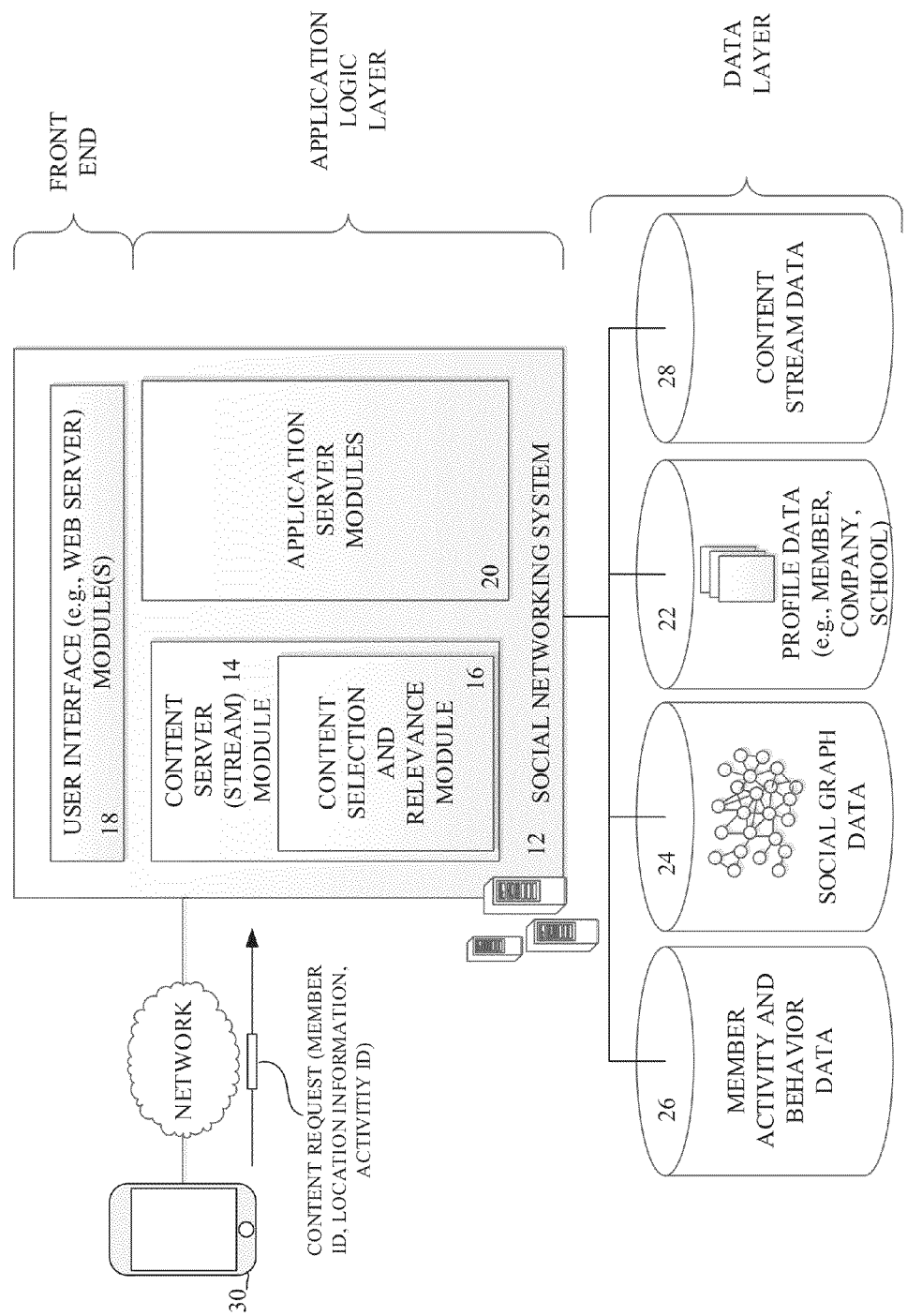
FIG. 2 is a network diagram depicting a server system that includes a content selection and relevance module for selecting, ranking and ordering content items, in response to the server system receiving a content request from a mobile computing device, consistent with some embodiments of the present invention.

FIG. 2 is a network diagram depicting a server system (e.g., social networking system 12) that includes a content server (stream) module 14 having a content selection and relevance module 16 for selecting, ranking and ordering content items, in response to the server system 12 receiving a content request from a mobile computing device 30, consistent with some embodiments of the present invention. As described in greater detail below, the content server module 14 receives content requests from mobile computing devices, such as that with reference number 30 in FIG. 2. In addition to a member identifier that uniquely idetnfies the member of the social networking service, the content request may include location information identifying a member's current location, and/or an activity identifier identifying a member's current activity state. Accordingly, the content selection and relevance module 16 can select content items from the content stream database 28 to communicate back to the mobile computing device 30 for presentation in the member's personalized content stream, based at least in part on the location information and/or activity identifier received with the content request.

As shown in FIG. 2, the social networking system 12 is generally based on a three-tiered architecture, consisting of a front-end layer, application logic layer, and data layer. As is understood by skilled artisans in the relevant computer and Internet-related arts, each module or engine shown in FIG. 2 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 2. However, a skilled artisan will readily recognize that various additional functional modules and engines may be used with a social networking system, such as that illustrated in FIG. 2, to facilitate additional functionality that is not specifically described herein. Furthermore, the various functional modules and engines depicted in FIG. 2 may reside on a single server computer, or may be distributed across several server computers in various arrangements. Moreover, although depicted in FIG. 2 as a three-tiered architecture, the inventive subject matter is by no means limited to such an architecture.

As shown in FIG. 2, the front end layer consists of a user interface module (e.g., a web server) 18, which receives requests from various client-computing devices including one or more mobile computing devices 30, and communicates appropriate responses to the requesting client computing devices. For example, the user interface module(s) 18 may receive requests in the form of Hypertext Transport Protocol (HTTP) requests, or other web-based, application programming interface (API) requests. The client devices may be executing conventional web browser applications, or applications that have been developed for a specific platform to include any of a wide variety of mobile computing devices and mobile-specific operating systems.

As shown in FIG. 2, the data layer includes several databases, including a database 22 for storing data for various entities of the social graph, including member profiles, company profiles, educational institution profiles, as well as information concerning various online or offline groups. Of course, with various alternative embodiments, any number of other entities might be included in the social graph, and as such, various other databases may be used to store data corresponding with other entities.

Consistent with some embodiments, when a person initially registers to become a member of the social networking service, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database with reference number 22.

Once registered, a member may invite other members, or be invited by other members, to connect via the social networking service. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases.

As members interact with various applications, content, and user interfaces of the social networking system 12, information relating to the member's activity and behavior may be stored in a database, such as the database with reference number 26. Accordingly, the content selection and relevance module 16 may select and rank content items for presentation in a member's content stream based at least in part on a member's past activity, as stored in the database with reference number 26. More specifically, one or more content recommendation algorithms may utilize information about a member's activity to identify specific types of content, or event specific content items, for presentation to the member. For example, if a member's activity and behavior data indicates that the member has been interacting with content relating to a particular subject matter or topic (e.g., articles relating to computer programming), the content selection and relevance module 16 may increase a weighting factor applied as part of a ranking algorithm to content items that are related to or associated with the particular subject matter or topic. Similarly, if a member is interacting with a particular type of content (e.g., job postings), the content selection and relevance module 16 may increase a weighting factor applied as part of a ranking algorithm to content items that are of the particular content type. This will ensure that those content items likely to be of interest to the member are presented more prominently in the member's personalized content stream.

In addition to an activity or content stream, the social networking system 12 may provide a broad range of other applications and services that allow members the opportunity to share and receive information, often customized to the interests of the member. For example, with some embodiments, the social networking system 12 may include a photo sharing application that allows members to upload and share photos with other members. With some embodiments, members of a social networking system 12 may be able to self-organize into groups, or interest groups, organized around a subject matter or topic of interest. With some embodiments, members may subscribe to or join groups affiliated with one or more companies. For instance, with some embodiments, members of the social networking service 12 may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with the social graph data of the database with reference number 24.

The application logic layer includes various application server modules 20, which, in conjunction with the user interface module(s) 12, generates various user interfaces with data retrieved from various data sources or data services in the data layer. With some embodiments, individual application server modules 20 are used to implement the functionality associated with various applications, services and features of the social networking system. For instance, a messaging application, such as an email application, an instant messaging application, or some hybrid or variation of the two, may be implemented with one or more application server modules 20. A photo sharing application may be implemented with one or more application server modules 20. Similarly, a search engine enabling users to search for and browse member profiles may be implemented with one or more application server modules 20. Of course, other applications and services may be separately embodied in their own application server modules 20.

As illustrated in FIG. 2, one application server module is a content server (stream) module 14, which includes a content selection and relevance module 16. Generally, the content server module 14 receives, over a computer or data network, content requests from various computing devices, including various mobile computing devices. A content request generally includes a member identifier that uniquely identifies a member of the social networking service. In addition, a content request may include other information, such as location information indicating a current location of a mobile computing device from which the content request was initiated. In addition, a content request may include an activity identifier identifying a member's current activity state, as inferred by processing various signals from various sensors at the mobile computing device. A content request may include information specifying the device type and/or application information from which the content request was initiated. Once received at the content server module 14, the content request is processed by the content selection and relevance module 16 to identify content items for presentation in the content stream of the particular member from whom the request was received.

With some embodiments, in selecting and ranking content items to be presented to the member in his or her content stream, the content selection and relevance module 16 may utilize a wide variety of information. For example, such information may include information concerning the member's past activity and behavior, and information identifying the entities (e.g., members, companies, groups, topics, web pages, etc.) with which the member is connected or is following as defined in the social graph of the social networking service. Additionally, in selecting content items for presentation in a member's content stream, the content selection and relevance module 16 may utilize information received with the content request, such as location information indicating a member's current location and an activity status identifier. For example, the content selection and relevance module 16 may compare a member's current location, as indicated by information received via the content request, with one or more specific locations at which the member is known to frequently be located, such as his or her home or workplace. In this way, the member's current location may be used to select content appropriate for the member's current location. For example, in some scenarios it may be preferable to present the member with job listings only when the member is at home, or in a location other than his current work place. Similarly, certain content items particularly relevant to the member's current job might be given preference for presentation in the content stream when the member is viewing his or her content stream at his or her workplace. With some embodiments, the content selection and relevance module may select and rank content items based in part on the inferred activity state of the member, as indicated by the activity status identifier received with a content request. Accordingly, content items may be selected and/or formatted for presentation in a content stream based in part on the member's current physical activity state.

Figure 3:
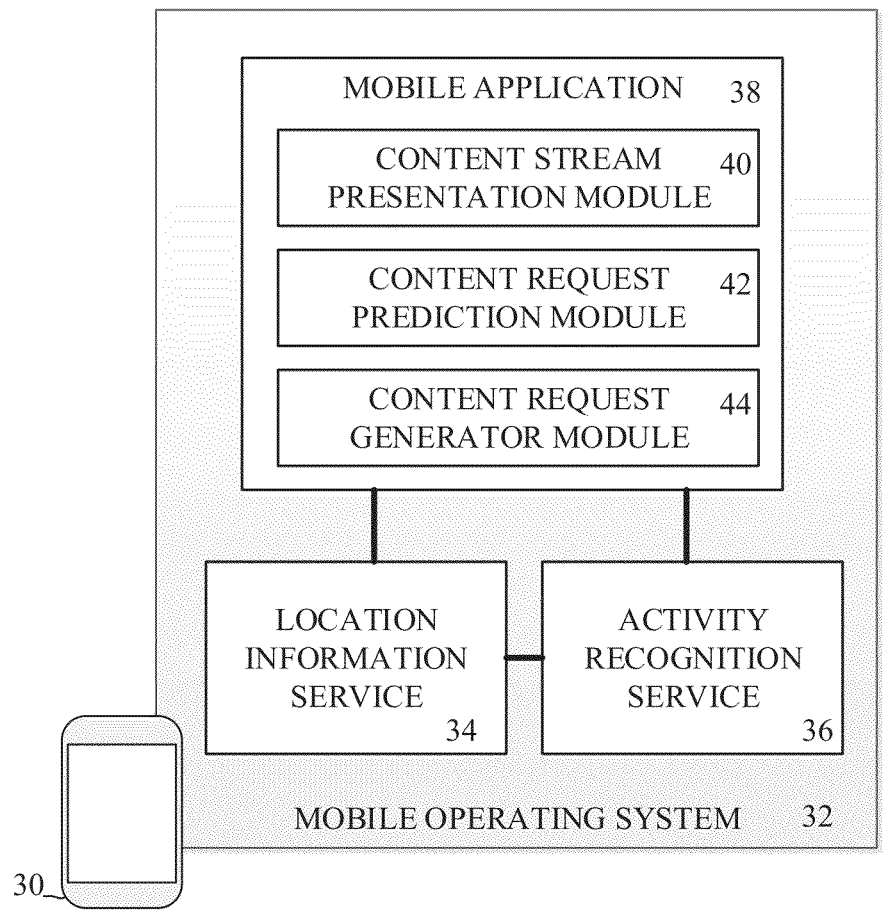
FIG. 3 is a functional block diagram depicting some of the functional modules of a mobile computing device, consistent with some embodiments of the invention.

FIG. 3 is a functional block diagram depicting some of the functional modules of a mobile computing device 30, consistent with some embodiments of the invention. As is understood by skilled artisans in the relevant computer- and mobile device-related arts, each module or engine shown in FIG. 3 represents a set of executable software instructions and the corresponding hardware (e.g., memory, processor, sensor devices) for executing the instructions, and deriving or generating relevant data. To avoid obscuring the inventive subject matter with unnecessary detail, various functional modules and engines that are not germane to conveying an understanding of the inventive subject matter have been omitted from FIG. 3.

As illustrated in FIG. 3, the mobile computing device 30 includes a mobile operating system 32, which has both a location information service (or, module) 34 and an activity recognition service (or, module) 36. With some embodiments, one of these two services may be a sub-component of the other, or may be combined as a single service or module. In any case, the services 34 and 36 provide an application-programming interface (API) that allows the mobile application 38 to invoke various functions, or access certain data, that are provided and/or derived by the respective services. For example, the location information service 34 may operate with one or more location sensing components or devices (e.g., a GPS component, WiFi® triangulation, iBeacons or other indoor positioning systems, and so forth) to derive location information representing the current location of the mobile computing device 30, as well as the current speed and direction of travel. The mobile application 38, by making an API request to the location information service 34, can obtain this location information (e.g., current location, direction and speed of travel, etc.) of the mobile computing device. Accordingly, with some embodiments, the location information can be included with a content request communicated to a content server, thereby allowing the content server to select content items based at least in part on the current location of the user, or the current location and direction and speed of travel.

With some embodiments, the activity recognition service 36 may be configured to receive information or data signals from one or more motion sensing components or devices, such as an accelerometer, compass, and/or gyroscope. In addition, the activity recognition service may receive location information from a location sensing component or device, such as a GPS component, indoor positioning system (or other location sensing component), and/or a wireless network interface. By analyzing the information or data signals generated by these various sensing components, the activity recognition service 36 can generate information representing the inferred physical activity state of the member of the social networking service. For example, the various sensing components may generate a combination of signals from which the activity recognition service can infer a particular activity state of the member, to include, but certainly not to be limited to: walking, running, sitting, standing, driving in a vehicle, and riding in a vehicle.

With some embodiments, the inferred physical activity state of the member may be represented by a single activity status identifier that is assigned a particular value to represent the most likely current physical activity state of the member (e.g., walking=1, running=2, sitting still=3, standing=4, etc.). In other embodiments, each of several activity status identifiers may be assigned a value or score representing a measure of the likelihood that a member is in a certain physical activity state (e.g., walking=0.90, running=0.45, sitting still=0.03, standing=0.11, etc.). In yet other embodiments, the inferred physical activity state of the member may be represented by a single activity status identifier that is assigned a particular value to represent the most likely current physical activity state of the member, in combination with another value that represents the likelihood or probability that the member is in the inferred physical activity state (e.g., activity state identifier=1, confidence level=0.90). Of course, an activity status identifier may be encoded in any of a number of other ways as well.

Accordingly, when a user of the mobile computing device is walking, an accelerometer, gyroscope and compass will generally detect motion (and direction) consistent with such activity. An activity status identifier may be assigned a particular value (e.g., a number) that identifies the member's current physical activity state, for example, walking or running. Alternatively, a specific activity status identifier for walking may be assigned a value or score representing the probability or likelihood that the member is at that moment engaged in the particular physical activity—that is, for example, walking. Similarly, when a user places his or her mobile computing device flat on a desk or table top, the sensing components will generally detect motion (or lack thereof) that is consistent with such activity.

In some instances, in addition to signals generated by an accelerometer, gyroscope and/or compass, the activity recognition service 36 may also analyze information received from other data sources, to include information from one or more location sensing components (e.g., GPS, iBeacon, etc.). By analyzing location information, including the current location (e.g., latitude and longitude coordinates) as well as the direction and speed of travel, the activity recognition service 36 can make meaningful inferences about the member's current activity state. For example, an accelerometer and gyroscope of a mobile computing device may detect motion consistent with a member that may be running, while the member's current location, speed and direction of travel, as evidenced by information received via a GPS component, may indicate that the member is currently on a well-known trail or path, and moving in a direction and speed consistent with the member running on the trail or path. Accordingly, the more information from which the activity status identifier is inferred, the higher the confidence level may be for the particular inferred activity status identified.

With some embodiments, the activity recognition service 36 may use a mobile computing device's network activity status to determine the member's current physical activity state. For example, if a mobile computing device is currently paired and actively communicating with another Bluetooth® device known to be in an automobile or vehicle of the member, and the other sensors are detecting signals consistent with the mobile computing device being within a moving automobile or vehicle, the activity recognition service 36 may indicate a high probability that the member is currently driving. Similarly, if the sensors are detecting signals consistent with the mobile computing device being within a moving automobile or vehicle, but the mobile computing device is not currently paired or connected with a known data network (Bluetooth®, personal area network, controller area network, etc.), the activity recognition service 36 may indicate a high probability that the member is currently riding, but not driving, in a vehicle.

With some embodiments, a mobile application 38 may register a request with the activity recognition service 36 to receive periodic updates regarding the inferred activity state of the user of the mobile computing device 30 who is a member of the social networking service. Accordingly, after receiving the request, the activity recognition service 36 may periodically communicate information to the mobile application 38 about the user's inferred activity state. With some embodiments, the activity recognition service 36 may only provide the mobile application 38 with information concerning the current inferred activity status when there is a change from one status to another, or, when the confidence level for a particular activity status exceeds some predefined threshold. In other embodiments, the mobile application 38 may periodically poll the activity recognition service 36 for the current inferred activity state.

Referring again to FIG. 3, the mobile application 38 includes a content stream presentation module 40, a content request prediction module 42, and a content request generator module 44. In general, the content stream presentation module 40 facilitates the presentation of the content stream including all of the content items received via a content server, via a display of a mobile computing device, to the user of the mobile computing device 30 (i.e., the member of the social networking service). The content request generator module 44 initiates a content request in response to a user of the mobile application 38 (a member of the social networking service) manually manipulating a user interface element, such that the content request is communicated to a content server. In addition, and as described below, the content request generator module 44 may automatically initiate a content request (e.g., without explicit user interaction) when the content request prediction module 42 detects that certain conditions are satisfied, where the satisfaction of the conditions are determined to be a good predictor of when the member is likely to view his or her content stream.

With some embodiments, the content request prediction module 42 performs two functions. First, the content request prediction module 42 receives and analyzes various information (e.g., location, activity state of the member, time of day, etc.) to determine a set of conditions that are present when a member manually initiates a request for content items from a content server, and views his or her content stream. Accordingly, by identifying various conditions that exist when a member manually initiates a content request, the content request prediction module can, over time, identify patterns or conditions that precede or occur simultaneously with the member initiating a content request and viewing his or her content stream. For example, a particular member may exhibit a pattern of regularly using his or her mobile computing device to view his or her content stream at the same time of day (e.g., 7:30 AM) from the same location (e.g., local coffee shop). Similarly, a user may use a tablet computer each morning, or evening, to view his or her content stream. By detecting motion of a particular type using the accelerometer, gyroscope, and/or compass of the tablet computing device, the content request prediction module can establish some conditions that, when satisfied, will result in an automatic content request being communicated to a content server. Accordingly, the content request prediction module 42 will identify the pre-existing conditions that signal that the member is likely to view his or her content stream.

Once such conditions have been identified and established as the prediction criteria for pre-fetching content items for a content stream, the content request prediction module 42 will monitor various signals—for example, the current inferred activity status of the member, the current time of day, and the current location of the mobile computing device—to determine or predict when the user is likely to view his or her content stream. When the predefined conditions are determined to be satisfied, the content request prediction module 42 will trigger an automatic content request to the server so that the content request generator module 44 communicates the content request to the content server, and the mobile application 38 receives "fresh" content items to present to the member via his or her content stream. In this way, the mobile application 38, operating in the background, can pre-fetch current and contextually relevant content items even before a member has opened the mobile application to view his or her content stream. Furthermore, by using the inferred activity state of the user to trigger the automatic content requests, the content requests are more timely than content requests that might be triggered based on some predefined schedule.

With some embodiments, the conditions upon which the automatic triggering of the content request occur may be based upon the member being in a particular physical activity state, or, exhibiting a change from one physical activity state to another, as inferred by the activity recognition service 36. Similarly, the conditions may be based upon some combination of the member being in a particular physical activity state, or, exhibiting a change from one physical activity state to another, while simultaneously being in a particular location, or being in a particular location while traveling in a particular distance at a particular speed, and so on. In yet other instances, the conditions may involve the time of day, such that an automatic triggering of a content request occurs when the member is in a physical activity state only at a particular time (e.g., hour) of day. Of course, in other scenarios, any combination of the aforementioned conditions may be used to establish the predefined conditions that, when satisfied, will result in the automatic triggering of a content request to the content server, thus eliminating the likelihood that a member must wait for "fresh" content to be received and rendered in his or her content stream.

Figure 4:
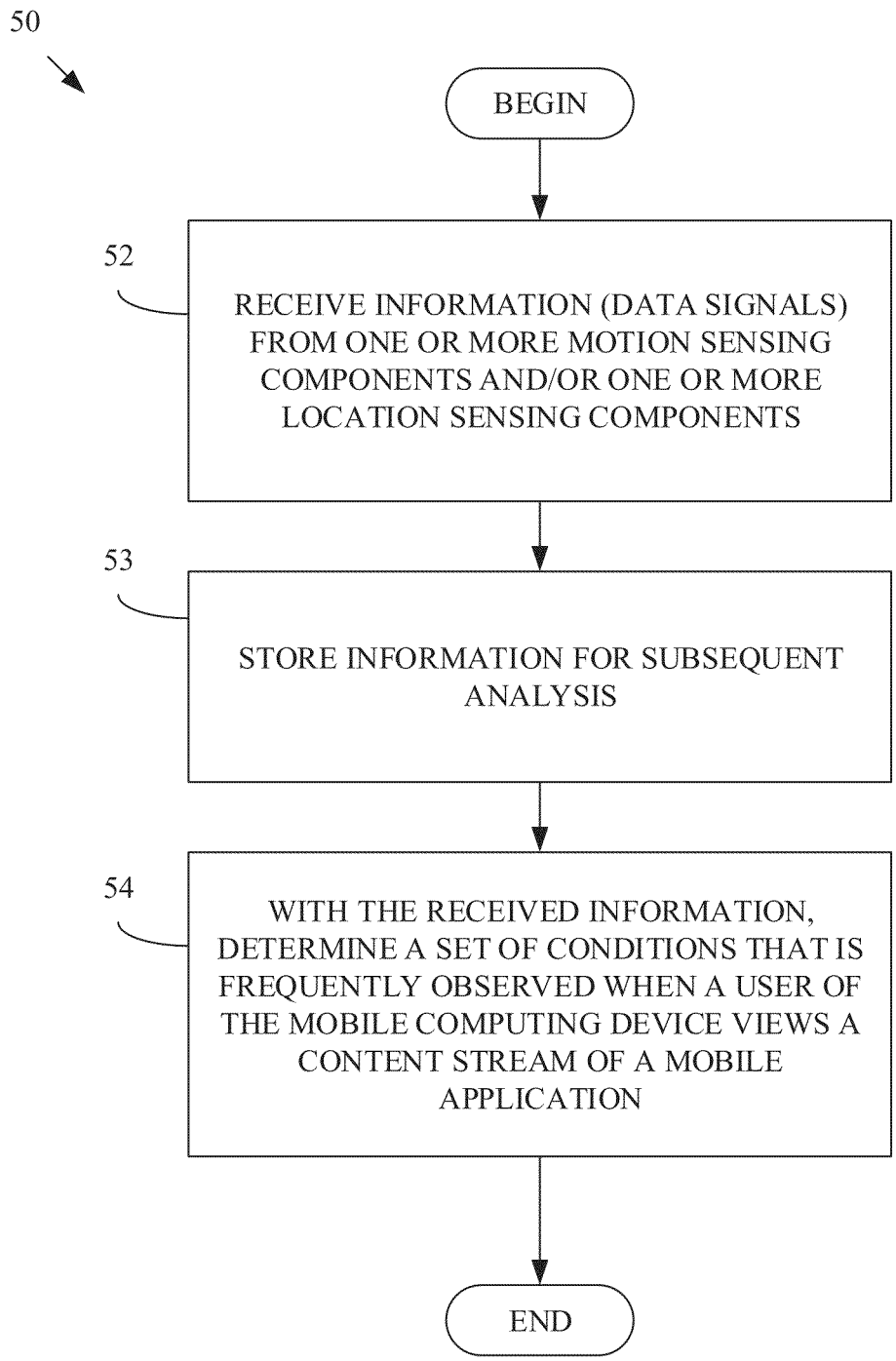
FIG. 4 is a flow diagram illustrating example method operations performed by a mobile computing device when analyzing a variety of input data signals to establish some predefined conditions, that, when satisfied, will automatically cause a mobile application to communicate a content request to a content server, consistent with some embodiments of the invention.

FIG. 4 is a flow diagram illustrating the method operations involved in a method 50 for establishing a set of conditions upon which a content request is automatically triggered, according to some embodiments. With some embodiments, a mobile computing device includes a set of executable instructions, a process or a module that receives information (e.g., data signals) from a variety of sensors, such as motion sensing components (e.g., an accelerometer, gyroscope, compass, etc.) and/or location sensing components. Accordingly, at method operation 52, information or data signals are received from a variety of sensing components. At method operation 53, the information is stored for subsequent analysis. At method operation 54, the information from these sensors is analyzed to identify patterns of frequently observed data that can be used to predict when a user of the mobile computing device is going to invoke an application to view his or her personalized content stream. For example, when certain information or data signals received from the sensors has a high co-occurrence with a manual (i.e., user-initiated) request for content to be presented in the content stream, the information might be used to make subsequent predictions as to when the user is going to want to view his or her content stream. Similarly, when certain information has a high co-occurrence with an event indicating that a user is viewing his or her content stream, the information might be used to make subsequent predictions as to when the user is going to want to view his or her content stream.

Figure 5:
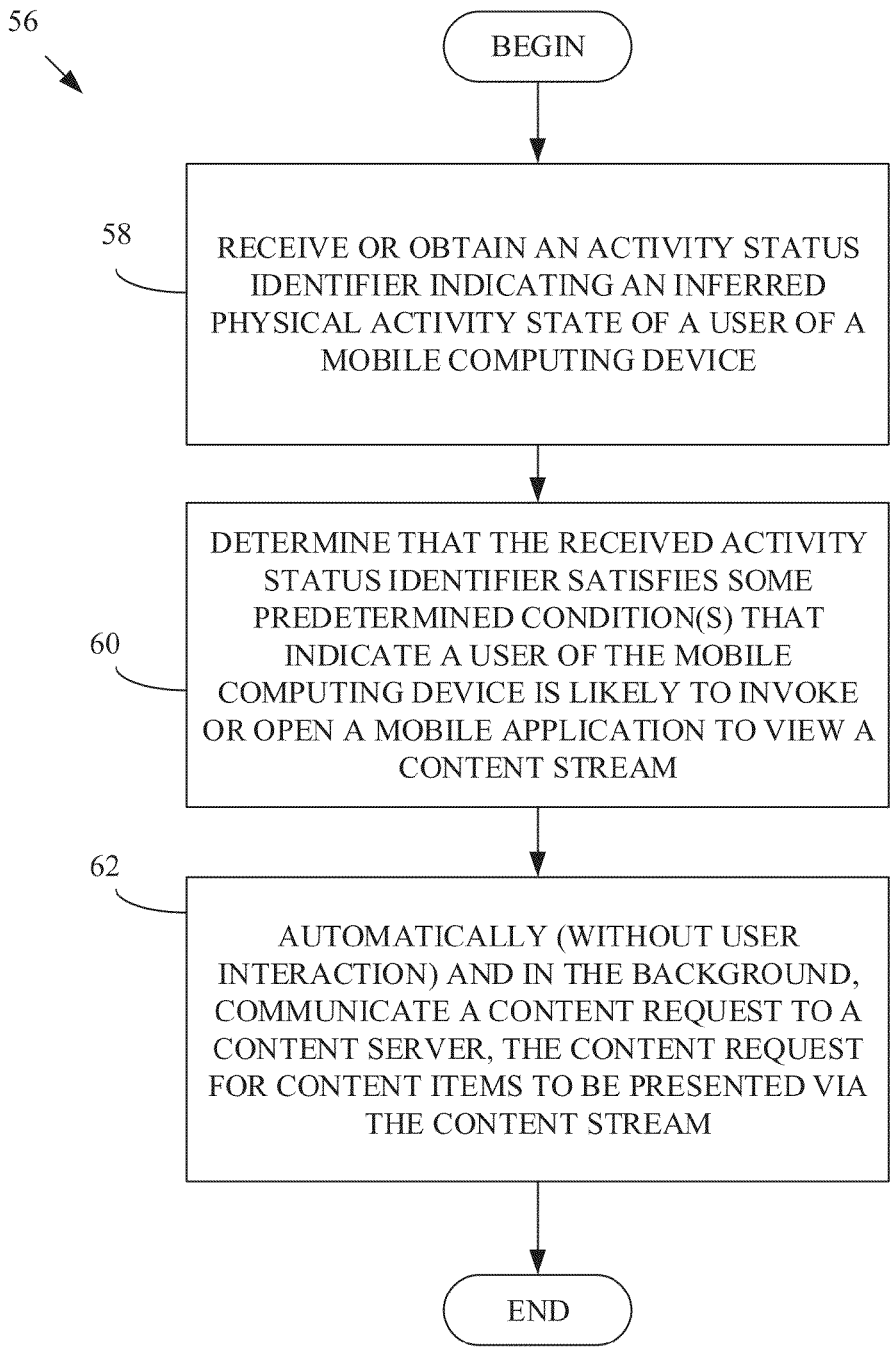
FIG. 5 is a flow diagram illustrating example method operations performed by a mobile computing device, where the method is for automatically communicating a content request to a content server upon detecting that some predefined conditions involving at least the inferred activity state of a user are satisfied, consistent with some embodiments of the invention.

FIG. 5 is a flow diagram illustrating the method operations involved in a method 56 to automatically (without explicit user interaction) communicate a content request to a content server upon determining that some predefined conditions have been satisfied, according to some embodiments. For instance, at method operation 58, an activity status identifier is received or otherwise obtained at a mobile application executing on a mobile computing device. The activity status identifier represents or identifies one of a plurality of inferred physical activity states of the user of the mobile computing device. For example, depending upon a variety of different data signals received from various sensing devices, an activity status identifier may take on any one of a number of values representing a particular inferred physical activity state, to include, but not to be limited to: walking, running, sitting, standing, driving in a vehicle, and riding in a vehicle. The activity status identifier may be received at the mobile application, as a result of the mobile application registering a request to receive such information from an activity recognition module or service of the mobile operating system.

At method operation 60, the received or obtained activity status identifier is used in an algorithm to evaluate whether one or more predefined conditions are satisfied, where satisfaction of the predefined condition or conditions is an indicator that the user is highly likely to make a request for "fresh" content for viewing in a content stream. For example, if the activity status identifier has a particular value, indicating that the user of the mobile computing device is in a particular physical state, and the particular physical state is one that is commonly detected prior to the user viewing his or her content stream, the detection of the physical activity state may satisfy the condition upon which an automatic content request is triggered.

At method operation 62, in response to determining that the established condition or conditions are satisfied, an automatic content request is generated and communicated to a content server. With some embodiments, the content request may include a unique identifier for the requesting member, as well as location information identifying the current location of the member, and in some instances an activity status identifier indicating the user's inferred physical activity state.

Although not expressly shown in FIG. 5, responsive to sending the automatic content request, the mobile application will receive content items from a content server. The content items are stored so that they are immediately available for presentation to the user when the user views his or her content stream.

Figure 6:
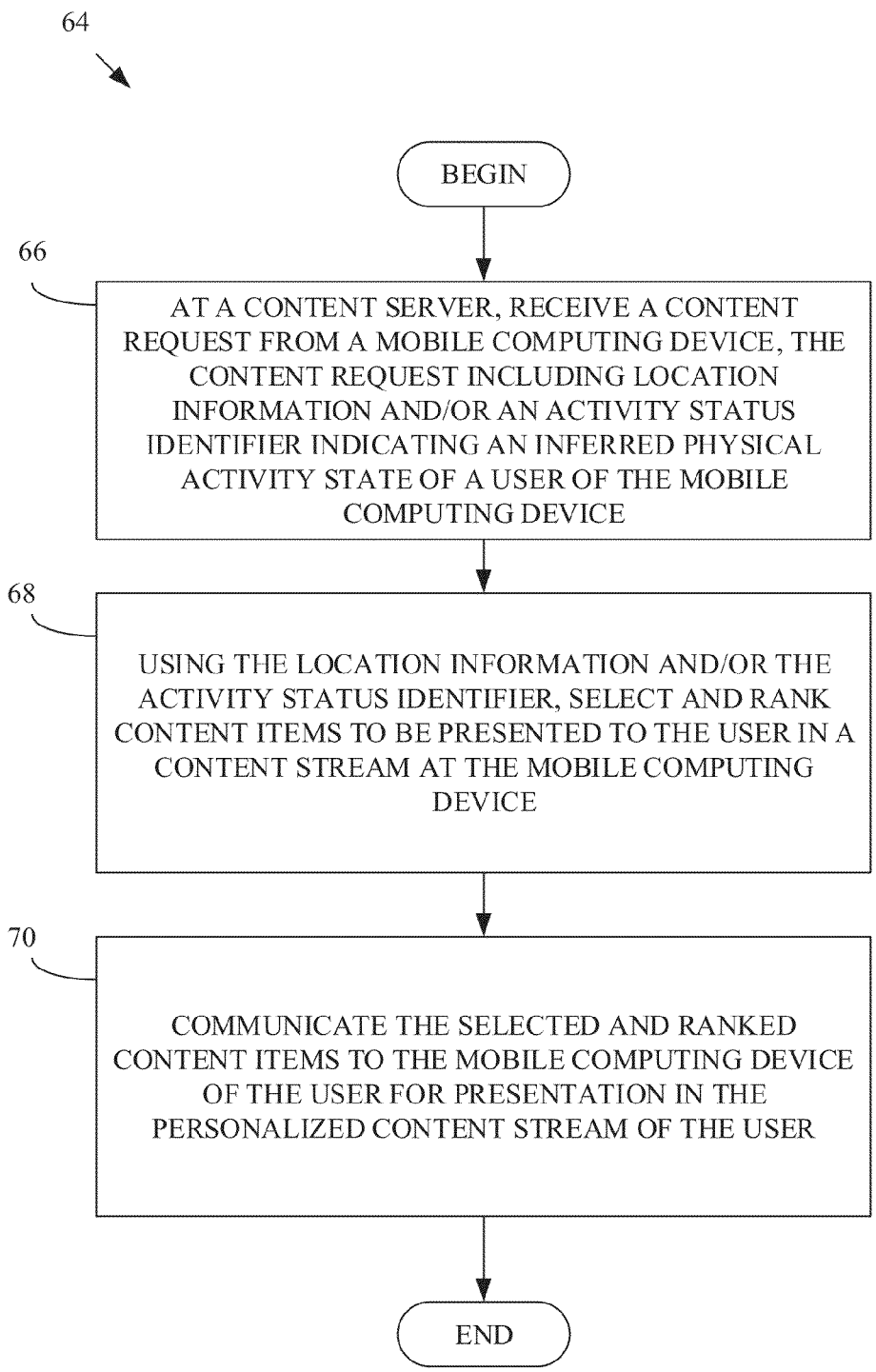
FIG. 6 is a flow diagram illustrating the method operations performed by a content server when processing a content request that includes information identifying a user's current location and/or information identifying a user's current activity state, consistent with some embodiments of the invention.

FIG. 6 is a flow diagram illustrating the method operations 64 performed by a content server when processing a content request that includes information identifying a user's current location and/or information identifying a user's current activity state, consistent with some embodiments of the invention. At method operation 66, a content server receives a content request from a mobile computing device. The content request includes location information identifying the current location (and optionally, the direction and speed of travel) of the mobile computing device (and thus, the user). In addition, or as an alternative, the content request may include an activity status identifier identifying a current inferred physical activity state of the user.

At method operation 68, based on a member identifier received with the content request, and based on the location information and/or the activity status identifier, various content items are selected for presentation to the user via his or her content stream. With some embodiments, a content selection algorithm will use the location information and/or activity status identifier to select relevant content items for presentation to the user. Similarly, with some embodiments, the location information and/or activity status identifier may impact the ranking that particular content items are assigned, and thus their position with respect to other content items in the content stream.

For example, if a content request is received with location information indicating a member is at work, the content selection algorithm may select content deemed appropriate for work, and may refrain from selecting content that is deemed not appropriate for work. For example, if a user is currently at his or her place of employment, the user may desire to not have job postings presented in his or her content stream. With some embodiments, the content selection and ranking algorithms may select and rank certain content items based on those content items having been posted to the content server from the same location as the member's current location. For example, if a member is currently attending a particular event at a convention center, the content selection algorithm may select content that was published to the content server from devices that were located at the convention center at the time the content was published to the content server. In other instances, the content selection and ranking algorithms may select and rank content items based on a determination that the content items are associated with a particular location from which the content request was received. For example, if the member is currently visiting a museum in New York city, the content selection algorithm may select content associated with the museum for presentation to the member in his or her content stream.

Similarly, the content items may be selected based in part on the member's current activity status. If, for example, a content request includes an activity status identifier indicating that the member is currently walking, the content items selected for presentation may be selected for their ease of reading while walking—for example, shorter text and more pictures, etc. With some embodiments, the presentation format of content items presented to the user may be selected based on an activity status identifier. For example, if a user is currently driving, content items may be automatically spoken back to the user with a text to voice translator. Similarly, if a user is currently walking or jogging, With some embodiments, when the content selection and relevance module receives a content request for a member, and the content request includes location information, the content selection and relevance module may first obtain information about the member. For example, if the member's prior activity and behavior information indicate the member has been engaging in job-seeking activities (e.g., viewing job listings, making connections with key people responsible for hiring, such as recruiters, etc.) via the social network service, the member may have a high job-seeker score. That is, the member may be classified as a job-seeker, such that the content selection and relevance module may select one or more job listings to present to the member. However, the content selection and relevance module may use the member's current location information, as received with the content request, to select job listings that are associated with companies having operating facilities that are proximate to the member's current location.

In yet another example, when the content selection and relevance module receives a content request for a member, and the content request includes location information, the content selection and relevance module may first determine one or more categories of interest of the member. Using this member interest information, the content selection and relevance module may identify one or more item listings that describe an item (e.g., a product or service) that is being offered by a store or company that is proximate to the member's current location, as determined by the location information received with the content request. With some embodiments, many stores and companies will have a presence in the social graph of the social network service, and therefore the locations of the stores and companies may be determined by simply obtaining profile information of the stores and/or companies.

In yet another example, the social networking service may provide an auction-based system by which members (particularly operators of stores and/or businesses, as well as advertisers) can bid to have content presented in the personalized content streams of other members, when those other members are in a particular location. Accordingly, when a content request with location information is received, the auction system may identify a current high bidder for presenting content to other members in the particular location identified by the location information. Of course, the bidding system may allow bidders to specify a wide variety of member profile attributes, including location, when bidding to have content presented.

The various operations of the example methods described herein may be performed, at least partially, by one or more processors that are temporarily configured (e.g., by software instructions) or permanently configured to perform the relevant operations. Whether temporarily or permanently configured, such processors may constitute processor-implemented modules or objects that operate to perform one or more operations or functions. The modules and objects referred to herein may, in some example embodiments, comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Figure 7:
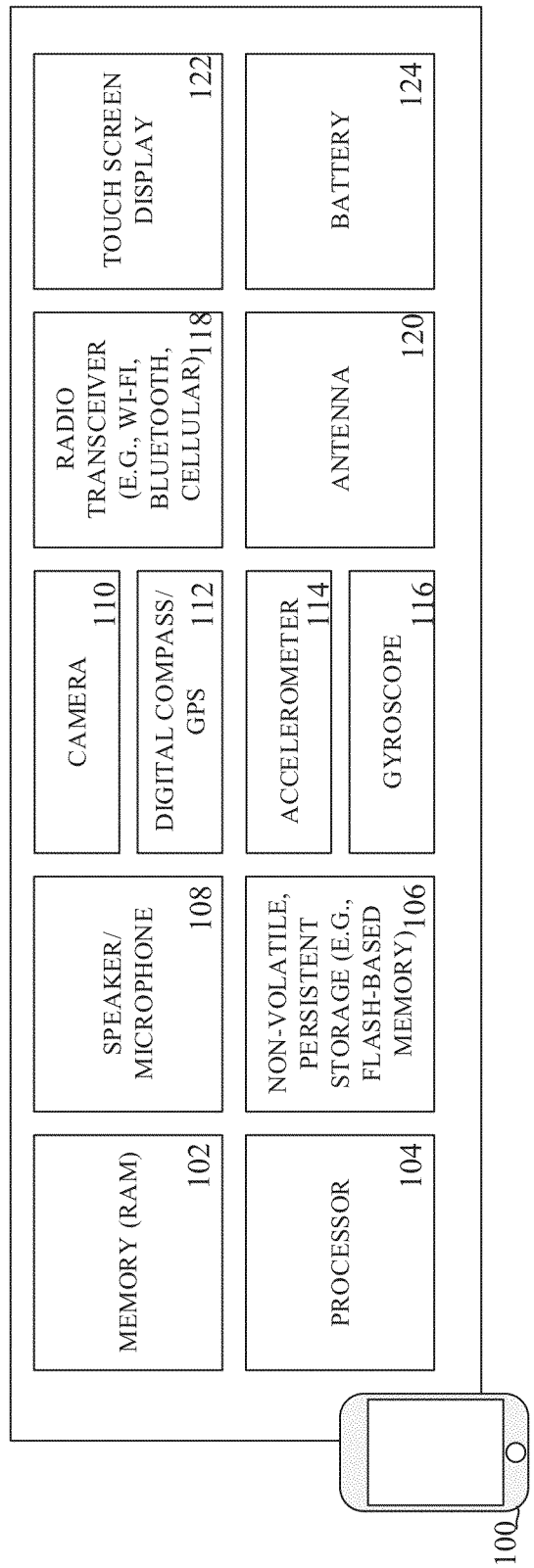
FIG. 7 is a block diagram of a mobile computing device within which instructions for causing some of the methodologies described herein may be executed.

FIG. 7 is a block diagram of the various functional components included in a mobile computing device with which some embodiments of the invention might be implemented. As illustrated in FIG. 7, the mobile computing device 100 includes a battery 124 for powering the device 100 and its various components. In addition, the mobile computing device 100 includes a memory module (e.g., RAM) 102 and a processor 104 for executing an operating system (not shown) and various software applications (e.g., instructions stored in memory). In particular, the processor 104 and memory 102 are used to execute one or more software applications that automatically generate a content request when certain signals generated by other components (e.g., GPS 112, accelerometer 114, gyroscope 116, radio transceiver 118, etc) indicate a high likelihood that a user is about to view a content stream. With some embodiments, the software application will utilize one or more application programming interfaces (API's) supported by the mobile device's operating system. In addition, the mobile computing device 100 includes a non-volatile, persistent storage module 106, such as a flash-based memory drive for storing software applications, configuration settings for the device and so on.

Consistent with some embodiments, the mobile computing device 100 includes one or more components for use in generating location information and/or signals for use in generating an activity status identifier, representing an inferred activity state of a user. For example, as illustrated in FIG. 7, the mobile computing device 100 includes a digital compass and GPS component 112, an accelerometer 114 and a gyroscope 116 for generating information concerning the motion and position of the mobile computing device. By processing signals received from these components, an activity recognition module can generate an activity status identifier identifying a user's current physical activity state. Similarly, the GPS 112 and radio transceiver 118 may be used to generate location information, which might be included with a content request communicated to a server, thereby enabling the server to select contextually relevant content items for presentation to the user.

In some embodiments, the mobile computing device 100 includes a camera 110. The camera may be used to capture images that can be published, with location information, to a content server. Consistent with some embodiments, the mobile computing device 100 includes one or more radio transceiver modules 118 and one or more antennas 120 for sending and receiving wireless data communications. For example the radio transceiver module 118 may facilitate voice and/or data communications over a wireless telephone network, a wireless data network (e.g., Wi-Fi®), or a Bluetooth® network.

Figure 8:
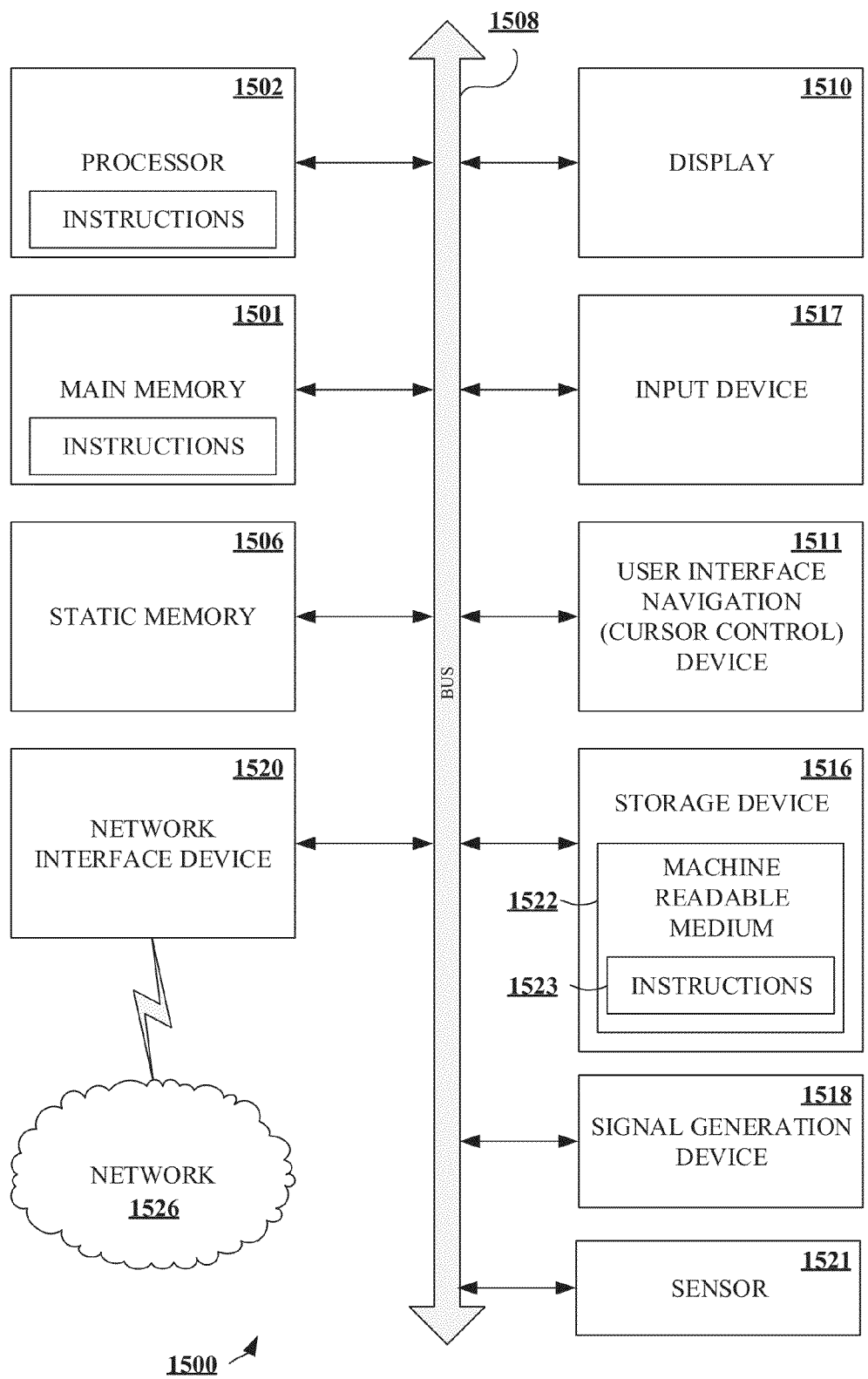
FIG. 8 is a block diagram of a machine in the example form of a server computer system within which instructions for causing the machine to perform some of the methodologies discussed herein may be executed.

FIG. 8 is a block diagram of a machine in the form of a computer system within which a set of instructions, for causing the machine to perform some of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device 1516 (e.g., drive unit), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method comprising:
at a processor-implemented content server module of a server computer, receiving a content request from a mobile computing device, the content request including a member identifier uniquely identifying a member of a social networking service and location information identifying the current location of the mobile computing device;
using the member identifier to retrieve a job-seeker score for the member;
determining that the job-seeker score exceeds a threshold;
responsive to determining that the job-seeker score exceeds the threshold, selecting a job posting as a content item for presentation in a personalized content stream of the member, the selecting of the job posting based at least in part on a determination that the job posting was published on behalf of an organization having an operating facility proximate to the current location of the mobile computing device; and
communicating the content item to the mobile computing device for display in the personalized content stream of the member.

2. The method of claim 1, further comprising:
selecting the content item for presentation in the personalized content stream of the member based at least in part on a determination that the content item was originally published from a location proximate to the current location of the mobile computing device.

3. The method of claim 2, further comprising:
selecting the content item thr presentation in the personalized content stream of the member based at least in part on a determination that the content item was published by another member of the social networking service with whom the member is connected or following.

4. The method of claim 1, further comprising:
selecting the content item for presentation in the personalized content stream of the member based at least in part on a determination that the content item includes a picture having meta-data indicating the picture was taken in a location proximate to the current location of the mobile computing device.

5. The method of claim 1, further comprising:
selecting the content item for presentation in the personalized content stream of the member based at least in part on a determination that the content item includes text relating to a subject matter that is pertinent to the current location of the mobile computing device.

6. The method of claim 1, further comprising:
selecting the content item for presentation in the personalized content stream of the member based at least in part on a determination that the content item was published on behalf of an organization having an operating facility proximate to the current location of the mobile computing device.

7. The method of claim 1, further comprising:
selecting, as the content item, a job posting for presentation in the personalized content stream of the member based at least in part on a determination that the job posting was published on behalf of an organization having an operating facility proximate to the current location of the mobile computing device.

8. The method of claim 1, further comprising:
with the member identifier, retrieving a category of items of interest to the member; and
selecting as the content item for presentation in the personalized content stream of the member an item listing describing an item being offered for sale at a location proximate to the current location of the mobile computing device.

9. The method of claim 1, further comprising:
with the member identifier, retrieving information identifying organizations to which the member has subscribed to follow via the social networking service; and
selecting the content item for presentation in the personalized content stream of the member based at least in part on a determination that the content item has been published by an organization to which the member has subscribed to follow and which has an operating facility proximate to the current location of the mobile computing device.

10. The method of claim 1, further comprising:
selecting the content item for presentation in the personalized content stream of the member based at least in part on a determination that an entity on whose behalf the content item has been published is the current high bidder in an auction for presenting content to members who are requesting content from a location proximate to the current location of the mobile computing device.

11. The method of claim 1, further comprising:
receiving with the content request an activity status identifier identifying a current physical activity state of a user; and
using the current physical activity state of the user in the selection of the content item for presentation in the personalized content stream of the member.

12. A computer-based system comprising:
one or more server computers each having a processor and a memory for storing executable instructions; and
executable instructions stored in the memory which, when executed by a processor of the computer-based system, will cause the system to:
receive a content request from a mobile computing device, the content request including a member identifier uniquely identifying a member of a social networking service and location information identifying the current location of the mobile computing device;
use the member identifier to retrieve a job-seeker score for the member;
determine that the job-seeker score exceeds a threshold;
responsive to determining that the job-seeker score exceeds the threshold, select a job posting as a content item for presentation in a personalized content stream of the member, the selection of the job posting based at least in part on a determination that the job posting was published on behalf of an organization having an operating facility proximate to the current location of the mobile computing device; and communicate the content item to the mobile computing device for display in the personalized content stream of the member.

13. The computer-based system of claim 12, wherein the executable instructions further cause the system to:

select the content item for presentation in the personalized content stream of the member based at least in part on a determination that the content item was originally published from a location proximate to the current location of the mobile computing device.

14. The computer-based system of claim 12, wherein the executable instructions further cause the system to:

select the content item for presentation in the personalized content stream of the member based at least in part on a determination that the content item was published by another member of the social networking service with whom the member is connected or following.

15. The computer-based system of claim 12, wherein the executable instructions further cause the system to:

select the content item for presentation in the personalized content stream of the member based at least in part on a determination that the content item includes a picture having meta-data indicating the picture was taken in a location proximate to the current location of the mobile computing device.

16. The computer-based system of claim 12, wherein the executable instructions further cause the system to:

select the content item for presentation in the personalized content stream of the member based at least in part on a determination that the content item includes text relating to a subject matter that is pertinent to the current location of the mobile computing device.

17. The computer-based system of claim 12, wherein the executable instructions further cause the system to:

select the content item for presentation in the personalized content stream of the member based at least in part on a determination that the content item was published on behalf of an organization having an operating facility proximate to the current location of the mobile computing device.

18. The computer-based system of claim 12, wherein the executable instructions further cause the system to:

select, as the content item, a job posting for presentation in the personalized content stream of the member based at least in part on a determination that the job posting was published on behalf of an organization having an operating facility proximate to the current location of the mobile computing device.

19. The computer-based system of claim 12, wherein the executable instructions further cause the system to:

with the member identifier, retrieving a category of items of interest to the member; and selecting as the content item for presentation in the personalized content stream of the member an item listing describing an item being offered for sale at a location proximate to the current location of the mobile computing device.

20. The computer-based system of claim 12, wherein the executable instructions further cause the system to:

with the member identifier, retrieve information identifying organizations to which the member has subscribed to follow via the social networking service; and select the content item for presentation in the personalized content stream of the member based at least in part on a determination that the content item has been published by an organization to which the member has subscribed to follow and which has an operating facility proximate to the current location of the mobile computing device.

21. The computer-based system of claim 12, wherein the executable instructions further cause the system to:

select the content item for presentation in the personalized content stream of the member based at least in part on a determination that an entity on whose behalf the content item has been published is the current high bidder in an auction for presenting content to members who are requesting content from a location proximate to the current location of the mobile computing device.

22. The computer-based system of claim 12, wherein the executable instructions further cause the system to:

receive with the content request an activity status identifier identifying a current physical activity state of a user; and use the current physical activity state of the user in the selection of the content item for presentation in the personalized content stream of the member.

* * * * *

UNITED STATES PATENT AND TRADEMARK OFFICE
CERTIFICATE OF CORRECTION

| | | |
|---|---|---|
| PATENT NO. | : 9,225,522 B2 | Page 1 of 1 |
| APPLICATION NO. | : 14/142461 | |
| DATED | : December 29, 2015 | |
| INVENTOR(S) | : Sameer Sayed | |

It is certified that error appears in the above-identified patent and that said Letters Patent is hereby corrected as shown below:

In the Claims

In column 17, line 50, in Claim 3, delete "thr" and insert --for--, therefor

Signed and Sealed this
Seventh Day of June, 2016

Michelle K. Lee
*Director of the United States Patent and Trademark Office*